(12) United States Patent
Shin

(10) Patent No.: US 8,098,274 B2
(45) Date of Patent: Jan. 17, 2012

(54) IMAGE SIGNAL TRANSMITTING/RECEIVING APPARATUS AND METHOD

(75) Inventor: Kyoung Sup Shin, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 12 days.

(21) Appl. No.: 11/907,598

(22) Filed: Oct. 15, 2007

(65) Prior Publication Data

US 2008/0045188 A1    Feb. 21, 2008

Related U.S. Application Data

(63) Continuation of application No. 09/917,722, filed on Jul. 31, 2001, now Pat. No. 7,301,556.

(30) Foreign Application Priority Data

Aug. 1, 2000    (KR) .................... 2000-44641

(51) Int. Cl.
*H04N 7/14* (2006.01)
*H04N 1/00* (2006.01)

(52) U.S. Cl. ........... 348/14.12; 348/211.5; 455/556.1

(58) Field of Classification Search ............ 348/14.02, 348/14.04, 14.05, 14.07–14.12, 14.13, 207.1, 348/333.11, 211.5, 211.6, 552, 211.1–211.3, 348/14.01, 211.12; 455/556.1, 557
See application file for complete search history.

(56) References Cited

U.S. PATENT DOCUMENTS

| | | | |
|---|---|---|---|
| 4,888,795 A * | 12/1989 | Ando et al. | 348/14.14 |
| 5,164,831 A | 11/1992 | Kuchta et al. | |
| 5,389,965 A | 2/1995 | Kuzma | |
| 5,745,161 A * | 4/1998 | Ito | 348/14.09 |
| 6,011,537 A * | 1/2000 | Slotznick | 715/733 |
| 6,137,485 A | 10/2000 | Kawai et al. | |
| 6,542,191 B1 * | 4/2003 | Yonezawa | 348/333.01 |
| 6,618,082 B1 * | 9/2003 | Hayashi et al. | 348/231.99 |
| 6,618,553 B1 | 9/2003 | Shiohara | |
| 6,714,238 B2 | 3/2004 | Urisaka et al. | |
| 6,801,719 B1 * | 10/2004 | Szajewski et al. | 396/333 |
| 6,919,923 B1 | 7/2005 | Tanaka et al. | |
| 2004/0169723 A1 * | 9/2004 | Kawasaki et al. | 348/14.01 |

* cited by examiner

*Primary Examiner* — David Ometz
*Assistant Examiner* — Carramah J Quiett
(74) *Attorney, Agent, or Firm* — KED & Associates, LLP

(57) ABSTRACT

The present invention relates to an image signal transmitting/receiving apparatus and method for selectively performing transmission and display of a main image signal. The present invention transmits and display an sub-image signal instead of the received main image signal in case that the cut-off mode with respect to the main image signal has been set.

12 Claims, 3 Drawing Sheets

IMAGE SIGNAL TRANSMITTING/RECEIVING APPARATUS AND METHOD

This application is a Continuation Application of application Ser. No. 09/917,722 filed Jul. 31, 2001 now U.S. Pat. No. 7,301,556, which claims priority from Korean Application Serial No. 44641/2000, filed on Aug. 1, 2000, the subject matters of which are incorporated herein by reference.

BACKGROUND OF THE INVENTION

1. Field of the Invention

The present invention relates to an image communication terminal, and more particularly, to an image signal transmitting/receiving apparatus and method for selectively performing transmission and display of a main image signal.

2. Description of the Background Art

Thanks to its handy portability and convenience in use, a mobile communication terminal is widely used. With its functions for phone book registration, memorandum and a days schedule, the mobile communication terminal is being developed as a means for managing personal information.

FIG. 1 illustrates an image signal transmitting and receiving apparatus having an image communication terminal (referred to as 'terminal', hereinafter) in accordance with a conventional art.

As shown in FIG. 1, the conventional image signal transmitting/receiving apparatus includes an image input unit 101 for inputting a main image signal, an encoder 102 for encoding the main image signal inputted through the image input unit 101, an image signal processor 103 for processing the encoded main image signal and transmitting it to a terminal of a receiving party, and processing the main image signal received from the terminal of the receiving party, a decoder 104 for decoding the main image signal received through the image signal processor 103, and an image signal display unit 105 for displaying the decoded main image signal on an LCD.

The operation of the conventional image signal transmitting and receiving apparatus constructed as described above will now be explained with reference to the accompanying drawings.

A main image signal inputted through the image signal input unit 101 is encoded by the encoder 102 and then inputted to the image signal processor 103. The image signal processor 103 processes the encoded main image signal and transmits it to the terminal of the receiving party, and processes the main image signal received from the terminal of the receiving party and outputs it to the decoder 104. The decoder 104 decodes the main image signal outputted from the image signal processor 103 and outputs it to the image signal display unit 105, so that the received main image signal is displayed on the LCD of the terminal.

While making an image communication by using the terminal, the user may not want to transmit the main image (his or her own image) to the other party, or display the image transmitted from the other party. At this time, the conventional terminal has shortcomings that the user should discontinue the telephone call in order to cut the main image to be transmitted or not to display the received image.

SUMMARY OF THE INVENTION

Therefore, an object of the present invention is to provide an image signal transmitting/receiving apparatus and method that is capable of selectively transmitting and displaying a main image signal.

To achieve these and other advantages and in accordance with the purpose of the present invention, as embodied and broadly described herein, there is provided an image signal transmitting/receiving method including the steps of: inputting a first image signal; checking whether a cut-off mode has been set for the first image signal; and transmitting and displaying a second image signal instead of the first image signal if the cut-off mode is set for the first image signal.

To achieve the above object, there is further provided an image signal transmitting/receiving apparatus including: an image signal processor for processing a main image signal; a display unit for displaying the received main image signal; a controller for checking whether a cut-off mode has been set for the main image signal; and an image signal selector for selectively outputting a sub-image signal instead of the main image signal to the image signal processor or the display unit in case that the cut-off mode has been set.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
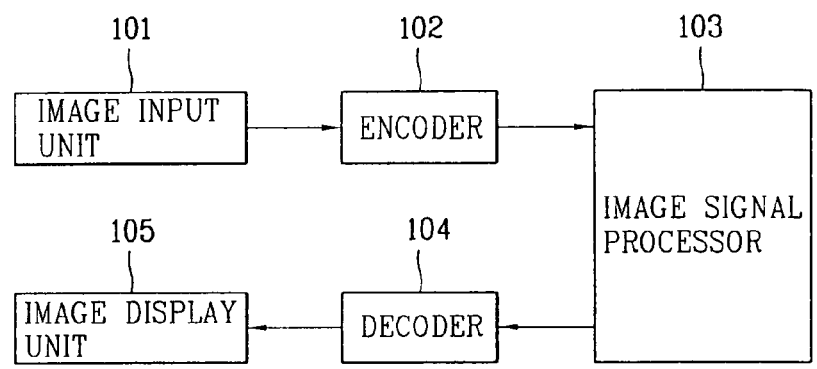
FIG. 1 is a schematic block diagram of an image signal transmitting and receiving apparatus in accordance with a conventional art.
Figure 2:
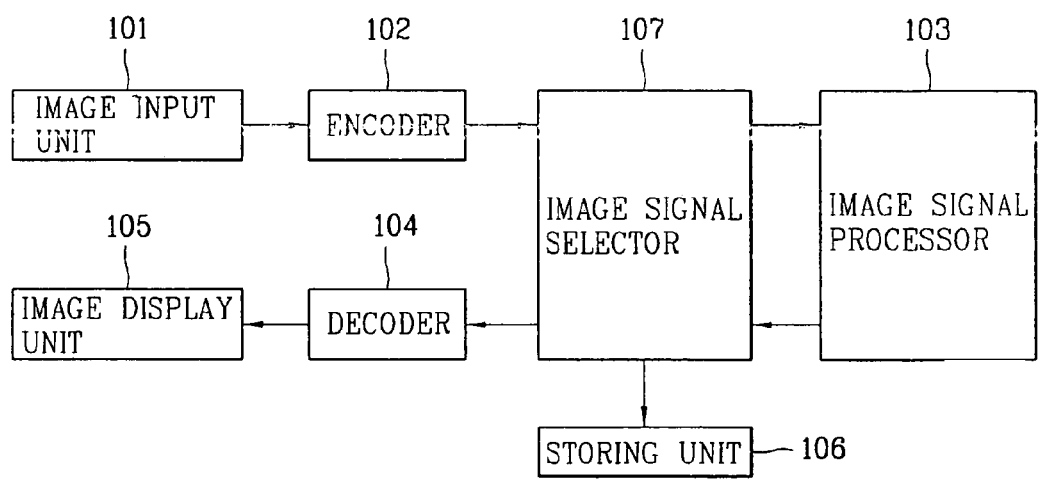
FIG. 2 is a schematic block diagram of an image signal transmitting and receiving apparatus in accordance with a preferred embodiment of the present invention.

As shown in FIG. 2, an image signal transmitting/receiving apparatus of an image communication terminal (termed to as 'terminal', hereinafter) in accordance with a preferred embodiment of the present invention includes a storing unit 106 for storing a sub-image signal and an image signal selector 107 for selectively outputting a main image signal encoded by an encoder 102 or the sub-image signal stored in the image signal storing unit under the control of a controller (not shown), which are additional to the conventional image signal transmitting and receiving apparatus as shown in FIG. 1.

Figure 3:
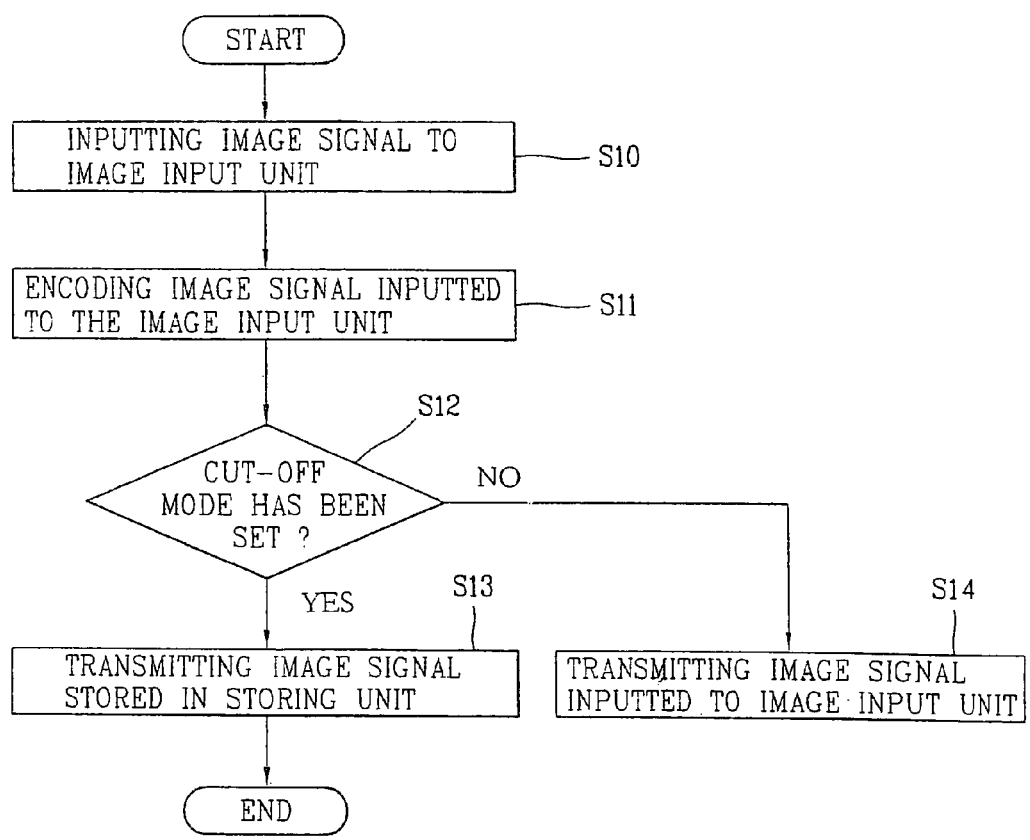
FIG. 3 is a flow chart of a method for selectively transmitting a main image signal of FIG. 2 in accordance with the preferred embodiment of the present invention.
Figure 4:
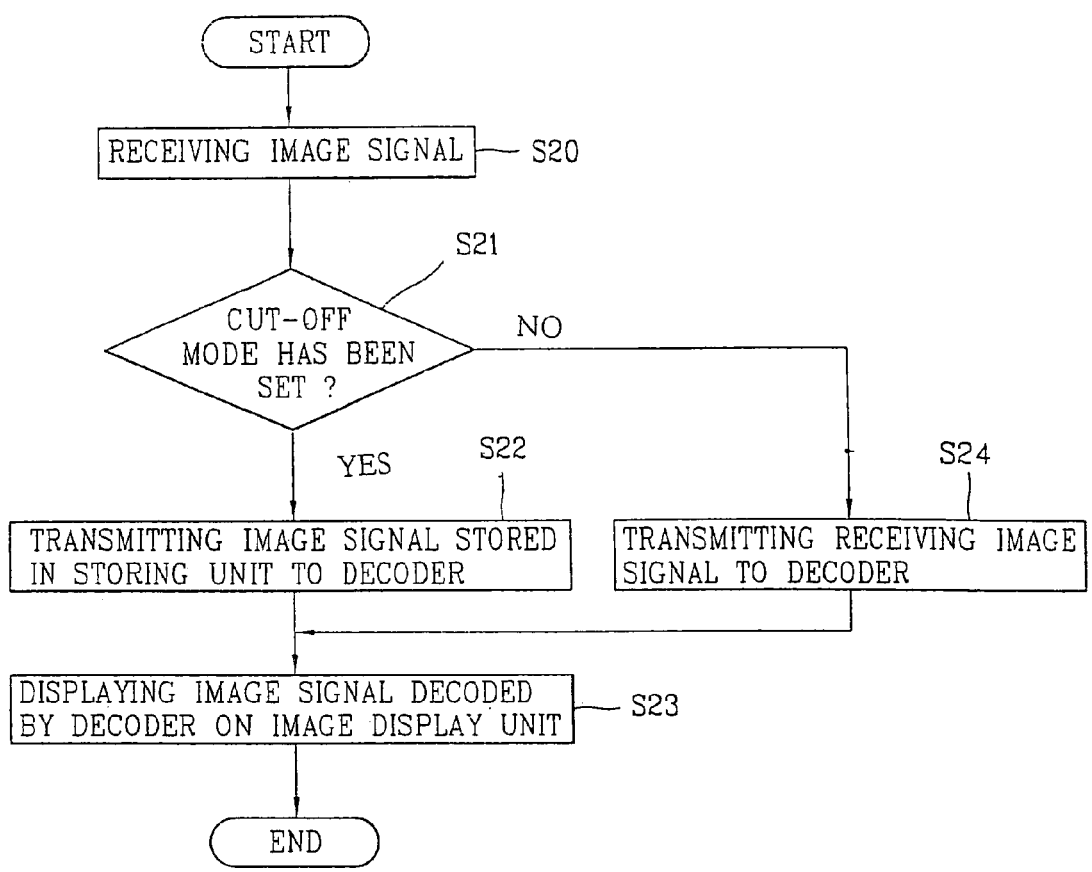
FIG. 4 is a flow chart of a method for selectively displaying a main image signal of FIG. 2 in accordance with the preferred embodiment of the present invention

The operation of the image signal transmitting and receiving apparatus constructed as described above will now be explained with reference to FIGS. 2 to 4.

A user sets a cut-off mode for a main image signal to be transmitted and a received image signal by setting a menu of a terminal or a key inputting at the initial stage or during telephonic communication.

When the main image signal to be transmitted (referred to as a transmission image signal) is inputted (step S10), the main image signal is encoded by the encoder 102 (step S11). A controller (not shown) checks whether a cut-off mode has been set for the main image signal step S12). In case that the cut-off mode has been set, the controller controls the selector 107 so that a sub-image signal stored in the image signal storing unit 106 can be outputted to the image processor 103 (step S13).

At this time, as for the sub-image signal stored in the image signal storing unit 106, a predetermined image signal stored by the user or the main image signal previously transmitted through the image signal processor 103 can be repeatedly used.

Accordingly, as the image signal processor 103 processes the sub-image signal stored in the image signal storing unit 106 and transmits it, the user can cut off the main image from being transmitted to the other party during a telephonic communication.

Meanwhile, in case that the cut-off mode has not been set, the controller controls the image signal selector 107, so that the main image signal outputted from the encoder 102 can be outputted through the image signal processor 103 (step S14).

When a main image signal is received from the terminal of the other party (step S20), the controller checks whether the cut-off mode has been set for the main image signal (step S21).

In case that the cut-off mode has been set for the main image signal, the controller controls the image signal selector 107, so that the sub-image signal stored in the image signal storing unit 106 can be outputted to the decoder 102 (step S22).

Then, as the decoder 102 processes the sub-image signal stored in the image signal storing unit 106 and transmits it, the user can cut off the main image of the other party from being displayed during a telephonic communication (step S23).

Meanwhile, in case that the cut-off mode has not been set, the controller controls the image signal selector 107, so that the received main image signal can be outputted through the image signal processor 103 to the decoder 102 likewise in the conventional art (step S24).

As so far described, according to the image signal transmitting/receiving apparatus and method of the present invention, the main image signal can be selectively transmitted and displayed. Thus, the user can transmit and display the main image signal as necessary without being interrupted during the telephonic communication.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method of image-based communications performed by a mobile terminal, the method comprising:
    initiating an outgoing call transmitted from the mobile terminal or an incoming call received by the mobile terminal;
    inputting a user setting related to the outgoing call and the incoming call, the user setting being input to the mobile terminal by a menu selection or a key input from a user of the mobile terminal;
    selectively transmitting, while the outgoing call is in progress, a first outgoing image or a second outgoing image according to the user setting inputted by the menu selection or the key input, the first outgoing image being an image related to the user and the second outgoing image being a replacement image to be used rather than the first outgoing image, wherein the second outgoing image is transmitted without the first outgoing image when the user setting is input by the menu selection or the key input and while the outgoing call is in progress, and the first outgoing image is transmitted without the second outgoing image when the user setting is not set and while the outgoing call is in progress; and
    selectively displaying, while the incoming call is in progress, a first display image or a second display image according to the user setting input by the menu selection or the key input, the first display image being an image related to another party that is received by the mobile terminal while the incoming call is in progress and the second display image being a replacement image to be displayed rather than the first display image, wherein the second display image is displayed without displaying the first display image even though the first display image is received from the another party when the user setting is set and while the incoming call is in progress, and the first display image is displayed without displaying the second display image when the user setting is not set and while the incoming call is in progress.

2. The method of claim 1, wherein the second outgoing image is transmitted rather than the first outgoing image when the user setting indicates that the user does not want to transmit the first outgoing image while the outgoing call is in progress.

3. The method of claim 1, wherein the second display image is displayed rather than the first display image when the user setting indicates that the user does not want to display the first display image while the incoming call is in progress and even though the first display image is received from the another party.

4. The method of claim 1, wherein the first outgoing image is captured by an image input unit of the mobile terminal.

5. The method of claim 1, wherein at least one of the second outgoing image and the second display image is stored in memory.

6. The method of claim 1, wherein inputting the user setting includes inputting a cut-off mode for the first outgoing image and inputting a cut-off mode for the first display image, by the menu selection or the key input.

7. The method of claim 1, wherein inputting the user setting includes selecting a cut-off mode for the first outgoing image and selecting a cut-off mode for the first display image, by the menu selection or the key input.

8. The method of claim 1, wherein the user setting for the selectively displaying and the selectively transmitting depends on whether a cut-off mode has been set or not based on the menu selection or the key input.

9. A mobile terminal that performs image-based communications, the mobile terminal comprising:
    a memory to store images;
    a display to display images;
    an image selector to select from among a first outgoing image and a second outgoing image for an outgoing call transmitted from the mobile terminal, and to select from among a first display image and a second display image for an incoming call received by the mobile terminal; and a controller cooperating with the memory, the display, and the image selector such that:

the outgoing call or the incoming call is initiated, a user setting related to the outgoing call and the incoming call is inputted to the mobile terminal by a menu selection or a key input from a user of the mobile terminal, and the first outgoing image or the second outgoing image is selectively transmitted while the outgoing call is in progress, according to the user setting inputted by the menu selection or the key input, wherein the first outgoing image is an image related to the user and the second outgoing image is a replacement image to be used rather than the first outgoing image, and wherein the second outgoing image is transmitted rather than the first outgoing image when the user setting input by the menu selection or the key input indicates that the user does not want to transmit the first outgoing image while the outgoing call is in progress, and the first outgoing image is transmitted without the second outgoing image when the user setting is not set and while the outgoing call is in progress, and the first display image or the second display image is selectively displayed while the incoming call is in progress, according to the user setting input by the menu selection or the key input, wherein the first display image is an image related to another party that is received by the mobile terminal while the incoming image is in progress and the second display image is a replacement image to be displayed rather than the first display image even though the first display image is received from the another party, and wherein the second display image is displayed rather than displaying the first display image when the user setting input by the menu selection or the key input indicates that the user does not want to display the first display image even though the first display image is received from the another party while the incoming call is in progress, and the first display image is displayed at the mobile terminal without displaying the second display image when the user setting is not set and while the incoming call is in progress.

10. The mobile terminal of claim 9, wherein the user setting being input includes inputting a cut-off mode for the first outgoing image and inputting a cut-off mode for the first display image, by the menu selection or the key input.

11. The mobile terminal of claim 9, wherein the user setting being input includes selecting a cut-off mode for the first outgoing image and selecting a cut-off mode for the first display image, by the menu selection or the key input.

12. The mobile terminal of claim 9, wherein the user setting for transmitting the first outgoing image or the second outgoing image and for displaying the first display image or the second display image depends on whether a cut-off mode has been set or not based on the menu selection or the key input.

* * * * *